Figure 1:
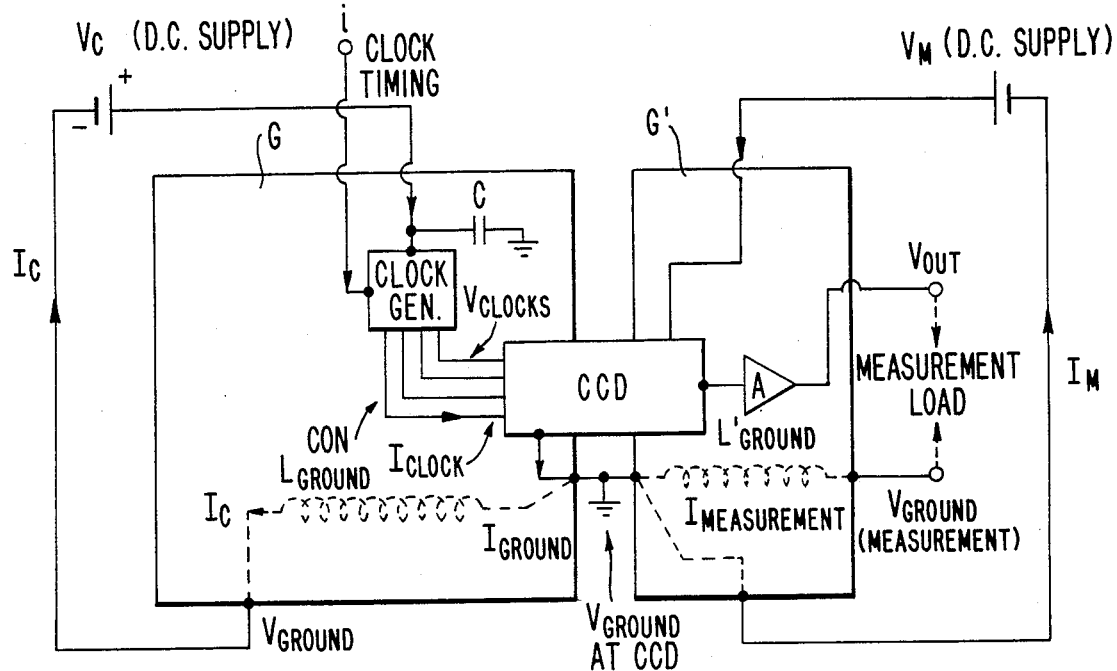

United States Patent [19]

Bishop

[11] Patent Number: 4,649,424
[45] Date of Patent: Mar. 10, 1987

[54] GROUNDING SYSTEM FOR CCD IMAGING APPARATUS AND THE LIKE

[75] Inventor: Robert Bishop, Brookline, Mass.

[73] Assignee: Beltronics Inc., Brookline, Mass.

[21] Appl. No.: 743,504

[22] Filed: Jun. 11, 1985

[51] Int. Cl.[4] .......................................... H01L 23/14
[52] U.S. Cl. ................................................. 357/84
[58] Field of Search .................. 357/84; 358/213, 212; 307/296 R, 542

[56] References Cited

U.S. PATENT DOCUMENTS 4,580,157 4/1986 Honda ................................. 357/84

Primary Examiner—Gene Z. Rubinson
Assistant Examiner—Stephen Brinich
Attorney, Agent, or Firm—Rines and Rines Shapiro and Shapiro

[57] ABSTRACT

Apparatus for rendering pixel resolution, with high signal-to-noise ratio, independent of clock signal-induced ringing effects that tend to blur such resolution as caused by the inherent inductance in the grounding system of CCD chip apparatus and the like, by a novel pair of wide ground plane configurations and interconnections, and separate ground-plane clock pulse and measurement current flow paths.

3 Claims, 2 Drawing Figures

GROUNDING SYSTEM FOR CCD IMAGING APPARATUS AND THE LIKE

The present invention relates to CCD imaging apparatus and the like, being more particularly directed to the grounding and circuit connection architecture and organization of the CCD chip circuitry and its clocking drive and output measurement circuits.

In CCD image sensors and similar picture scanning cameras and pick-up apparatus, oscillation or ringing in the ground plane conductors for the CCD chip circuitry, in response to currents generated by clock pulse switching transients, often deleteriously affects or perturbs the output signal measurements, causing smearing or blurring of the CCD element signals which, in turn, reduces the signal element or pixel resolution and the trueness of the elemental brightness on the display screen. It is to improvement, therefore, in the independence of the attained CCD signal pixel resolution (with high signal-to-noise ratio) from any such clock signal-induced ringing of the inherent inductance in the grounding system of the CCD chips, that the invention is primarily directed.

An object of the present invention, accordingly, is to provide a new and improved CCD or similar apparatus that attains such improved results in pixel resolution at high signal-to-noise ratio.

A further object is to provide such a CCD apparatus having a novel grounding and ringing suppression architecture.

Other and further objects will be explained hereinafter and are more particularly delineated in the appended claims.

In summary, though, from one of its principal features, the invention embraces in CCD imaging apparatus and the like embodying CCD chip means, clock generating chip circuitry and power supply means for providing clocking signals for the CCD chip means, and measurement output circuitry with cooperative power supply means for outputing signals corresponding to the images sensed and processed by the CCD chip means, apparatus for obtaining single element or pixel resolution with high signal-to-noise ratio independently of clocking signal-induced ringing of inherent inductance in the grounding system of the CCD chip means, said apparatus having, in combination, a pair of separate but adjacent ground plane surfaces mounting the CCD chip means, the clock generating chip circuitry and the measurement output circuitry, to be grounded; one of the separate ground plane surfaces mounting the clock generating chip circuitry and connected to receive power supply d.c. current flowing therethrough for the clock generation; the other adjacent ground plane surface mounting the measurement output circuitry and connected to receive power supply d.c. current flowing therethrough for measurement; means for connecting the adjacent ground planes at a limited region; relatively large capacitance means connected across and directly at the chip(s) of the clock generating chip circuitry and to ground; and a low inductance connection between said clock generating chip and the CCD chip means for insuring substantially instantaneous current for switching in response to the clock signals without clock pulse lead inductance distortion. Best mode and preferred embodiments and details are now presented.

Figure 2:
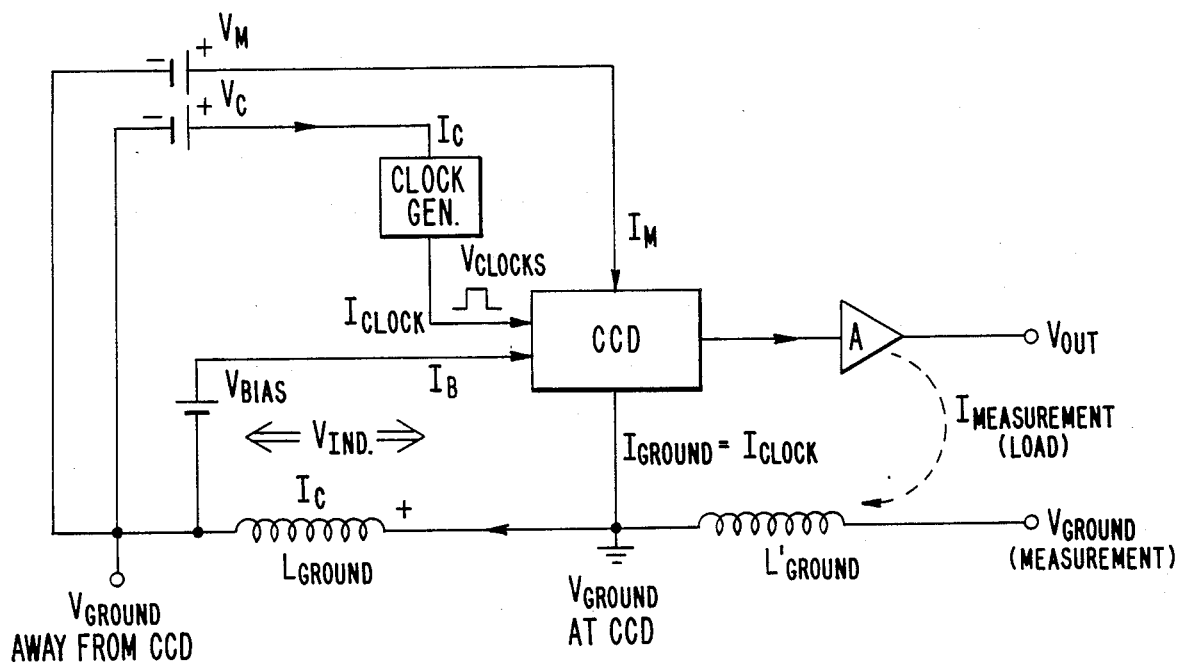

The invention will now be described with reference to the accompanying drawing,

FIG. 1 of which is an idealized circuit lay-out embodying the novel architecture of the invention; and FIG. 2 is a schematic circuit diagram of the operation of the system of FIG. 1.

Referring to FIG. 1, the CCD chip(s), so-labelled, is shown mounted as an overlap on two relatively wide, separate, but adjacent ground plane conductor surfaces G and G', the former shown somewhat larger than the latter and having mounted thereon, also, the clock pulse generator or driver, labelled "CLOCK GEN" in close proximity to the CCD unit. D.C. power supply voltage $V_c$ is shown supplied between the clock generator and the ground plane G in which this power supply current $I_c$ flows, and clocking timing pulses are applied by input i to generate the clock pulse $V_{clocks}$, FIG. 2, applied by the clock input leads to the CCD chip circuitry. It is the switching transients of this clocking that, in prior systems, causes the deleterious ringing in the inherent ground plane inductance schematically represented as $L_{ground}$. Measurement or output signal circuit D.C. power supply current is separately applied to the CCD by $V_{mdc}$ with respect to the other ground plane G', completing the measurement current circuit of the d.c. supply ($I_m$) through the ground plane G' as shown in dashed lines.

While some alleviation of the ringing problem can be obtained by decreasing the slope or reducing the rise time of the clock pulses and thereby reducing the current in the ground plane and the tendency to ring, this approach unfortunately slows down the operation of the CCD. In accordance with the present invention, it has been discovered that effective obviating of the resolution problem can be obtained by minimizing the inductance in the ground planes or at least its effect, and picking a measurement reference point that is minimally influenced by the switching clock transients.

Such an end is admirably achieved by a short limited region ground connection at or very close to the CCD chip ground terminal, bridging the adjacent edges of the wide ground plate surfaces G—G' at $V_{ground}$ at CCD. Under these circumstances, it has been found that by introducing a large capacitance C to ground, FIG. 1, close to the clock driver or generator (across the chip) and providing a low inductance connection CON to the input of the CCD, substantially instantaneous current is supplied for the clock switching which otherwise would be inhibited by the inductance of the supply current leads. The large or wide ground plane G keeps a low inductance between the ground of the capacitance C and the CCD chip, rapidly switching the clock signal to the CCD chip without lead inductance distortion.

The output of the CCD $V_{out}$, amplified or buffered at A, permits output measurement with respect to the $V_{gtest}$ ground terminal in a measurement load, so-labelled. The ground reference for any circuitry within the measurement ground plane $G^1$ is kept close to the $V_{ground}$ at CCD because there are no large ground currents in plane $G^1$, which, in view of its large size, has low ground plane inductance $L^1$ ground.

The clock current $I_{clock}$ (approximately equal to the ground current $I_{ground}$ at the CCD) flows through the inherent ground plane inductance $L_{ground}$ of the surface G, generating a voltage $V_{ind} = L_{ground}\, d/(dt)\, [$(capacitance of CCD lines) $d/(dt)\, V_{clocks}]$. The capacitance C may be of the order of $10^{-9}$ mfd. For a rate of change of $V_{clocks}$ of the order of 15 volts/$10^{-8}$ second, with an inductance $L_{ground}$ of the order of 1/10 microhenry, the ringing voltage across the ground plane inductance $V_{ind}$ will be 15 volts at the switching time of the clock pulses. For $L_{ground} = 1/1000$ microhenry with a wide conductive ground plane and with a wide conductor CON between the clock driver chip and the CCD clock input to provide low inductance, a greatly reduced 15 mv. ringing voltage is obtained. For 1/100 resolution on a 1½ volt total output, for example, it has been found necessary to achieve at least 15 mV or less of ringing or ground noise. The maximum resolution is therefore greatly affected by the clock ringing, and high resolution at high switching speeds can best be obtained using the methods described herein.

The clock current $I_{clock}$ thus flows from the ungrounded terminal of the capacitor C through the clock generator chip, through the low inductance connection CON to the CCD chip, out the ground terminal $V_{ground}$ at CCD, through the ground plane inductance $L_{ground}$, returning to the ground terminal of C. The extremely low inductance of this entire path minimizes ringing as before explained. The separate ground plane $G^1$ for the measurement circuitry insures that any residual minimum ringing will still not affect the measurement circuitry references.

Through this novel grounding architecture and organization, therefore, resolution with high signal-to-noise ratios of the order of, for example, 1/500 have been obtained with clock switching at a rate of 8 MHz, with CCD chip(s) of the TI, Reticon or Fairchild types, with a ground plane G of 3"×3" dimensions, an adjacent ground plane G' of 2"×2" dimensions, and a short ground connection at $V_{ground}$ at CCD of ⅛" length, the adjacent planes being separated by about ⅛".

Modifications will occur to those skilled in this art and such are considered to fall within the spirit and scope of the invention as defined in the appended claims.

What is claimed is:

1. In CCD imaging apparatus and the like embodying CCD chip means, clock generating chip circuitry and power supply means for providing clocking signals for the CCD chip means, and measurement output circuitry with cooperative power supply means for outputting signals corresponding to the images sensed and processed by the CCD chip means, apparatus for obtaining single element or pixel resolution with high signal-to-noise ratio independently of clocking signal-induced ringing of inherent inductance in the grounding system of the CCD chip means, said apparatus comprising, in combination, a pair of separate but adjacent ground plane surfaces having mounted thereon the CCD chip means, the clocking generating chip circuitry and the measurement output circuitry; one of the separate ground plane surfaces having mounted thereon the clock generating chip circuitry and being connected to receive power supply d.c. current flowing therethrough for the clock generation; the other adjacent ground plane surface having mounted thereon the measurement output circuitry and being connected to receive power supply d.c. current flowing therethrough for measurement; means for connecting the adjacent ground planes at a limited region; and large capacitance means connected directly at the chip(s) of the clock generating chip circuitry and to ground; and a low inductance connection between said clock generating chip circuitry and the CCD chip means for insuring substantially instantaneous current for switching in response to the clocking signals without clock pulse lead inductance distortion.

2. Apparatus as claimed in claim 1 and in which the path of clock current is from said capacitance means through the clock generating chip circuitry, said low inductance connection, the said CCD chip means and the said one of the ground plane surfaces back to the said ground of the said capacitance.

3. Apparatus as claimed in claim 2 and in which said limited region of connection of the ground planes is very close to the ground terminal of the CCD chip means.

* * * * *